No. 835,786. PATENTED NOV. 13, 1906.
H. J. FERRIS.
STRETCHER FOR WOVEN WIRE FENCES.
APPLICATION FILED APR. 4, 1906.
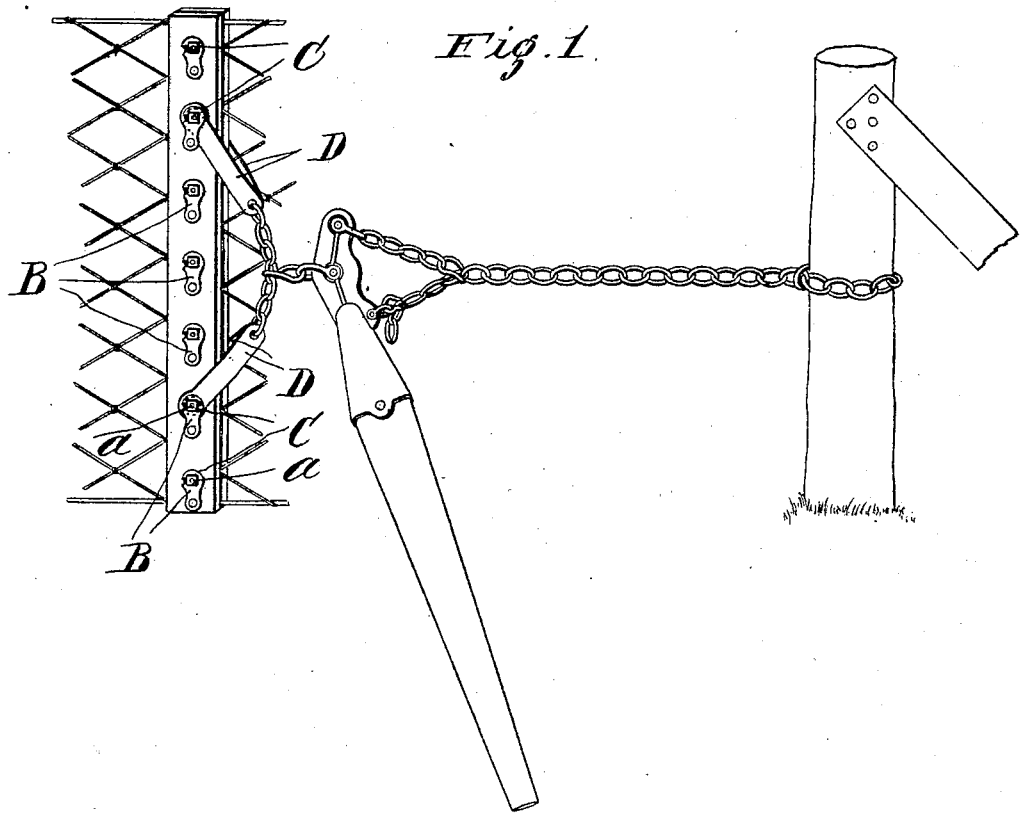
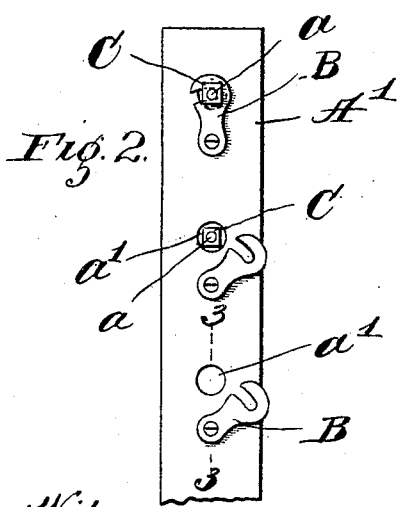
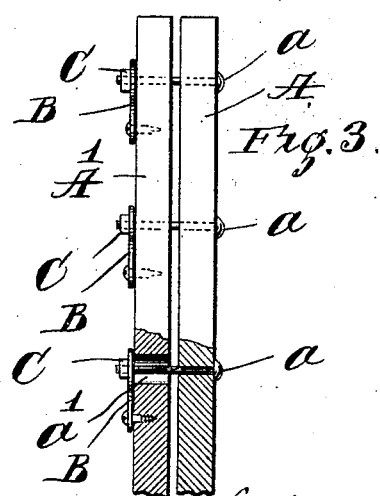
Witnesses:
Inventor:
Howard J. Ferris
by

UNITED STATES PATENT OFFICE.

HOWARD J. FERRIS, OF HARVARD, ILLINOIS, ASSIGNOR TO HUNT, HELM, FERRIS & COMPANY, OF HARVARD, ILLINOIS, A CORPORATION OF ILLINOIS.

STRETCHER FOR WOVEN-WIRE FENCES.

No. 835,786.      Specification of Letters Patent.      Patented Nov. 13, 1906.

Application filed April 4, 1906. Serial No. 309,790.

*To all whom it may concern:*

Be it known that I, HOWARD J. FERRIS, a citizen of the United States of America, residing at Harvard, in the county of McHenry and State of Illinois, have invented certain new and useful Improvements in Stretchers for Woven-Wire Fences, of which the following is a specification.

My invention relates to improvements in stretchers for woven-wire fences, and is fully described and explained in this specification and shown in the accompanying drawings, in which—

Figure 1 is a perspective view showing my improved device in use. Fig. 2 is a plan view of a portion thereof; and Fig. 3 is an elevation of one edge thereof, a portion of the device being shown in vertical section, as indicated by the line 3 3 of Fig. 2.

In wire-stretchers for woven-wire fences such as are now in common use it has heretofore been customary to use two members which are laid on opposite sides of the fence to be stretched and which are bolted together by bolts passing through the mesh of the fence. These members have been attached to a suitable stretching device of any ordinary form, with the result that the tension has been evenly and symmetrically transmitted to the fence. The use of such a device, however, is disadvantageous, for the reason that to place these members or clamping-bars upon the fence has required the complete removal of the bolts, with a consequent loss of a considerable amount of time and an unnecessary expenditure of labor. With my improved stretcher these clamping-bars are indicated by A A' in the drawings, and the bolts which secure them together are indicated by *a*. The heads of the bolts *a* bear against the locking member A, and their threaded ends pass through enlarged holes *a'* in the member A'. Pivotally secured to the member A' are a plurality of hooks B, which can be swung up, as shown at the upper portion of Fig. 2, or down, as shown at the lower portion thereof, so as to lie beneath or to be entirely free from nuts C, which can be screwed up on the threaded ends of the bolts *a*. These nuts are small enough to pass entirely through the perforations *a'* in the clamping member A', and the notches in the hooks B are of such size as to engage with and prevent the passage of said nuts, as set forth. It will thus be evident that the clamping-bars can be secured together in the ordinary way by swinging the hooks up to lie beneath the nuts and then setting the nuts tight, while the bars can be separated by merely loosening the nuts, swinging the hooks out of place, and drawing off the clamping-bar A'.

In practice it is desirable to secure the two clamping-bars to the stretching device by means of the same bolts which secure said members together, and I accomplish this in my device by utilizing loops D, formed of metal straps, one end of each of said loops having a hole which fits the body of one of the bolts *a*, lying just beneath the head of the same, and the other end of which has a larger opening through which the nut thereon can pass. These loops may be connected by a chain or other like device to the stretching device proper, which is shown in Fig. 1 in a general way.

It will be evident that, if desired, the bolts can be reversed so that the hooks will coact with the heads of the bolts instead of with the nuts thereon and correspondingly enlarging the perforations in the member A.

Many other variations in the construction can be adopted, if desired.

I claim as new and desire to secure by Letters Patent—

1. The combination with two clamping members and headed bolts provided with nuts adapted to clamp the same together, one of the members having perforations whereby it can be removed over the bolt-heads or nuts, of engaging devices adapted to be passed under the bolt-heads or nuts and having perforations of less size than the bolt-heads or nuts, whereby their passage through the member is prevented when the engagement devices are in engaging position.

2. The combination with two clamping members and headed bolts provided with nuts adapted to clamp the same together, one of said clamping members having perforations through which the bolt-heads or nuts can pass, and a plurality of hooks pivotally secured to one of the clamping members and adapted to be swung beneath the bolt-heads or nuts to engage the same.

3. The combination with two clamping members and headed bolts provided with nuts adapted to clamp the. same together, one of said clamping members having perforations through which the bolt-heads or nuts can pass, a plurality of hooks pivotally secured to one of the clamping members and adapted to be swung beneath the bolt-heads or nuts to engage the same, and loops adapted to secure the members to a stretching device, said loops being adapted to engage the bolts and having perforations substantially corresponding in size to the perforations in the corresponding clamping members.

In witness whereof I have signed the above application for Letters Patent, at Harvard, in the county of McHenry and State of Illinois, this 29th day of March, A. D. 1906.

HOWARD J. FERRIS.

Witnesses:
R. A. HEMENWAY,
C. E. PETERS.